United States Patent
Danestad et al.

(10) Patent No.: US 9,510,719 B2
(45) Date of Patent: Dec. 6, 2016

(54) VACUUM CLEANERS AND METHODS OF CONTROLLING A MOTOR DRIVEN BY A BATTERY SOURCE IN A VACUUM CLEANER

(75) Inventors: Ulrik Danestad, Stockholm (SE); Bo Pilsmo, Stockholm (SE)

(73) Assignee: Aktiebolaget Electrolux (SE)

( * ) Notice: Subject to any disclaimer, the term of this patent is extended or adjusted under 35 U.S.C. 154(b) by 24 days.

(21) Appl. No.: 14/408,648

(22) PCT Filed: Jun. 27, 2012

(86) PCT No.: PCT/EP2012/062503
§ 371 (c)(1),
(2), (4) Date: Dec. 17, 2014

(87) PCT Pub. No.: WO2014/000794
PCT Pub. Date: Jan. 3, 2014

(65) Prior Publication Data
US 2015/0150427 A1     Jun. 4, 2015

(51) Int. Cl.
H02P 29/00    (2016.01)
A47L 9/28     (2006.01)
H02P 7/00     (2016.01)

(52) U.S. Cl.
CPC .......... *A47L 9/2842* (2013.01); *A47L 9/2884* (2013.01); *H02P 7/00* (2013.01); *H02P 29/0033* (2013.01)

(58) Field of Classification Search
CPC .................................................. H02P 29/0033
USPC .......................................... 318/139, 34, 558
See application file for complete search history.

(56) References Cited

U.S. PATENT DOCUMENTS 6,624,606 B2 * 9/2003 Kushida ............. H02P 6/20
                                                 318/431
7,026,771 B2   4/2006 Kushida
7,298,110 B2 * 11/2007 Lindsey ............ H02K 11/33
                                                 318/444

(Continued)

FOREIGN PATENT DOCUMENTS

CN     1702953     11/2005
EP     1597995     11/2005

(Continued)

OTHER PUBLICATIONS

Office Action, with an English translation, for Chinese Patent Application No. 201080028804.2 dated Aug. 6, 2014.

(Continued)

*Primary Examiner* — David S Luo
(74) *Attorney, Agent, or Firm* — RatnerPrestia

(57) ABSTRACT

Vacuum cleaners and methods of controlling a motor driven by a battery source in a vacuum cleaner. The vacuum cleaner has a motor, a battery source for providing power to the motor, a voltage measuring unit for measuring a voltage over the motor, and a current measuring unit for measuring a current flowing through the motor. Further, the vacuum cleaner comprises a control unit for controlling, based on the measured voltage and/or the measured current, the power provided to the motor from the battery source to attain a target motor power value during a specified time period running from start-up of the motor, and to gradually decrease the power provided to the motor after the time period ends.

16 Claims, 3 Drawing Sheets

(56) References Cited

U.S. PATENT DOCUMENTS

| | | | |
|---|---|---|---|
| 7,599,758 B2 * | 10/2009 | Reindle | A47L 9/2821 15/3 |
| 2005/0258793 A1 | 11/2005 | Chin | |
| 2007/0175429 A1 | 8/2007 | Yanagida | |
| 2008/0048619 A1 | 2/2008 | Yoshida | |
| 2009/0179626 A1 | 7/2009 | Smith | |

FOREIGN PATENT DOCUMENTS

| | | |
|---|---|---|
| EP | 2064808 | 6/2009 |
| JP | 09112439 | 5/1997 |
| JP | 11128134 | 5/1999 |
| JP | 2000139792 | 5/2000 |
| JP | 2001353111 | 12/2001 |
| JP | 2002034869 | 2/2002 |
| JP | 2003000503 | 1/2003 |
| JP | 2003250737 | 9/2003 |
| JP | 2004000799 | 1/2004 |
| JP | 2005046242 | 2/2005 |
| JP | 2005168977 | 6/2005 |
| JP | 2007203101 | 8/2007 |
| JP | 2008188264 | 8/2008 |
| JP | 2010503505 | 2/2010 |
| WO | 2004032696 | 4/2004 |
| WO | 2008035034 | 3/2008 |
| WO | 2010126422 | 11/2010 |

OTHER PUBLICATIONS

Entire patent prosecution history of U.S. Appl. No. 13/318,063, filed, Jan. 9, 2012, entitled, "Vacuum Cleaner and Method for Controlling an Electric Motor."
Office Action for Korean Patent Application No. 10-2014-7019181 mailed Oct. 8, 2014, including English language translation.
International Search Report for PCT International Application No. PCT/EP2012/062503 mailed May 17, 2013.
JP Office Action for Application 2015518859 with English translation, mailed May 10, 2016 (5 pages).
Chinese Office Action with English language translation for Application No. 201280073975.6, dated Aug. 3, 2016, 27 pages.

* cited by examiner

VACUUM CLEANERS AND METHODS OF CONTROLLING A MOTOR DRIVEN BY A BATTERY SOURCE IN A VACUUM CLEANER

This application is a U.S. National Phase application of PCT International Application No. PCT/EP2012/062503, filed Jun. 27, 2012, the entire disclosure of which is expressly incorporated by reference herein.

TECHNICAL FIELD

The present invention relates to vacuum cleaners and methods of controlling a motor driven by a battery source in a vacuum cleaner.

BACKGROUND

Products driven by batteries have a general disadvantage compared to corded AC-driven products since battery voltage is reduced during a discharge cycle of a battery. In a battery powered vacuum cleaner including an electric motor, a decrease of battery power during the discharge cycle of the battery will result in a decrease of the suction power of the vacuum cleaner. Generally, the maximum inlet power of a fan unit of a vacuum cleaner powered by battery will decrease with 50% or more during the discharge cycle of the battery for a given motor current. Also, ageing of the battery will impact the power output such that the initial and highest power available for an aged battery can be reduced with more than a third as compared to a brand new battery. The electrical power supplied to motor is further dependent on a state of charge of the battery; i.e. at which point in a charge cycle the battery is when the charge cycle is interrupted. A further disadvantage is that the rate at which the voltage drops increases as the charge remaining in the battery decreases.

In order to limit the effect of battery voltage reduction over a discharge cycle in the art, feedback control has been proposed. In EP 2 064 808, this is accomplished by measuring the motor voltage and controlling the motor voltage towards a predetermined constant target value. Thus, instead of having a steady decrease in suction power of the vacuum cleaner during the discharge cycle of the battery, the vacuum cleaner is controlled to operate at a constant suction power which is lower than maximum available suction power at any point during the discharge cycle of the battery, until the battery no longer can deliver a supply voltage for achieving the set constant suction power, wherein the motor is instantly switched off.

From a user perspective, this approach may not be desired since there is a great risk that the predetermined constant value from a practical viewpoint is set too low. In EP 2 064 808, there is a clear trade-off to be made between an extended battery discharge cycle with a maintained constant suction power, and a less extended discharge cycle with higher constant suction power.

SUMMARY

An object of the present invention is to solve, or at least mitigate this problem in the art and provide an improved vacuum cleaner and a method of controlling a motor driven by a battery source in a vacuum cleaner.

This object is attained in a first aspect of the present invention by a method of controlling a motor driven by a battery source in a vacuum cleaner, which method comprises the steps of measuring a voltage over the motor, and controlling, based on the measured voltage, the voltage provided to the motor from the battery source to attain a target motor voltage value during a specified time period running from start-up of the motor and, when the specified time period has expired, controlling the voltage provided to the motor to gradually decrease with decreasing battery source voltage until the motor is powered off.

This object is further attained by a vacuum cleaner having features corresponding to those of the method of the first aspect of the present invention. Thus, a vacuum cleaner is provided comprising a motor, a battery source for providing power to the motor, and a voltage measuring unit for measuring a voltage over the motor. The vacuum cleaner further comprises a control unit for controlling, based on the measured voltage, the power provided to the motor from the battery source to attain a target motor voltage value during a specified time period running from start-up of the motor and, when the specified time period has expired, controlling the voltage provided to the motor to gradually decrease with decreasing battery source voltage until the motor is powered off.

Advantageously, with the present invention, a user will be able to start the vacuum cleaner and have the vacuum cleaner operate with a constant, and relatively high, suction power stipulated by the target motor voltage value during a specified time period, say somewhere in the range of 0-5 minutes, or more preferred 1-3 minutes, or even more preferred around 2 minutes, from start of the vacuum cleaner. After the specified time period has elapsed, the suction power is allowed to decrease with decreasing battery voltage until the vacuum cleaner is turned off. A battery-powered vacuum cleaner is usually used for shorter periods of time, for instance for briefly vacuum cleaning under a kitchen table in order to remove scraps, or a vestibule carpet for removing gravel and sand.

Thus, it is more desirable for a user that the vacuum cleaner is capable of maintaining a high constant suction power for many shorter instants of time than to maintain a low constant suction pressure for an extended period of time. Thus, by providing a relatively high suction power for a couple of minutes, and subsequently allowing the suction power to decrease with decreasing battery voltage during the battery discharge cycle, battery power is consume in a more user-friendly and efficient manner. In practice, it is likely that the user at most occasions not will operate the battery-driven vacuum cleaner for the complete specified time period before he or she turns the vacuum cleaner off, which has as a consequence that the same suction power most likely can be expected the next time the user starts the vacuum cleaner. With the method and vacuum cleaner of the present invention, the user will experience the high target suction power brought about by the set target motor voltage value for a great number of occasions when using the vacuum cleaner time periods until suddenly, when having reached a battery power level where the target suction power no longer can be attained, only a low suction power (or no suction power) can be produced by the vacuum cleaner, wherein the battery preferably is charged. This object is attained in a second aspect of the present invention by a method of controlling a motor driven by a battery source in a vacuum cleaner, which method comprises the steps of measuring a current flowing through the motor, and controlling, based on the measured current, the current provided to the motor from the battery source to attain a target motor current value during a specified time period running from start-up of the motor and, when the specified time period has expired, controlling the current provided to the motor to gradually decrease with decreasing battery source current until the motor is powered off.

This object is further attained by a vacuum cleaner having features corresponding to those of the method of the second aspect of the present invention. Thus, a vacuum cleaner is provided comprising a motor, a battery source for providing power to the motor, and a current measuring unit for measuring a current flowing through the motor. The vacuum cleaner further comprises a control unit for controlling, based on the measured current, the current provided to the motor from the battery source to attain a target motor current value during a specified time period running from start-up of the motor and, when the specified time period has expired, controlling the current provided to the motor to gradually decrease with decreasing battery source current until the motor is powered off.

As an alternative to the method and vacuum cleaner of the first aspect of the present invention, the method and vacuum cleaner of the second aspect of the present invention uses current to control the motor. The advantages set forth in the above for the method and vacuum cleaner of the first aspect are equally applicable to the second aspect. The second aspect of the present invention will not be further discussed in any detail.

Finally, the object is attained in a third aspect of the present invention by a method of controlling a motor driven by a battery source in a vacuum cleaner, which method comprises the steps of measuring a voltage over the motor, and measuring a current flowing through the motor. The method further comprises the step of controlling, based on the measured voltage and current, the power provided to the motor from the battery source to attain a target motor power value during a specified time period running from start-up of the motor.

This object is further attained by a vacuum cleaner having features corresponding to those of the method of the third aspect of the present invention. Thus, a vacuum cleaner is provided comprising a motor, a battery source for providing power to the motor, a voltage measuring unit for measuring a voltage over the motor, and a current measuring unit for measuring a current flowing through the motor. Further, the vacuum cleaner comprises a control unit for controlling, based on the measured voltage and the measured current, the power provided to the motor from the battery source to attain a target motor power value during a specified time period running from start-up of the motor.

The advantages set forth hereinabove for the first aspect of the present invention is equally applicable to the method and vacuum cleaner of the third aspect of the present invention. The third aspect of the present invention further recognizes that there is a need for more accurate control of motor power of a motor in a vacuum cleaner, which control is applied in consideration of motor load. More specifically, it should be made possible to control motor power such that a desired suction power is provided which is not affected by a change of airflow of the vacuum cleaner. A more accurate control of motor power in a vacuum cleaner is achieved according to embodiments of the present invention by using both the voltage over the motor and the current flowing through the motor as feedback parameters for controlling the power of the motor.

By using only voltage or current as a parameter for controlling the vacuum cleaner motor, it is not possible to adapt to situations where motor voltage or current is fluctuating, such as e.g. when the inlet of the vacuum cleaner is blocked or semi-blocked.

In situations where the airflow of the vacuum cleaner is reduced, e.g. when the inlet of the vacuum cleaner is blocked or semi-blocked, when a dust container of the vacuum cleaner is filled, and/or when a filter of the vacuum cleaner is clogged, the motor power will be reduced. More specifically, a reduction of airflow will reduce the current flowing through the motor, and hence the motor power will be reduced even though the voltage is held constant.

Thus, by further including the current as a feedback parameter according to embodiments of the present invention, more accurate control of the power of the motor is enabled, which in turn enables a more accurate control of suction power. Further advantageous is that by considering both motor current and voltage, the suction power can be held at a constant level even in a situation where the airflow of the vacuum cleaner is reduced.

A further advantage of the present invention is that the control of the power provided to the motor from the battery source, based on the measured motor voltage and the measured motor current, in order to attain a target motor power value during a specified time period running from start-up of the motor.

The target motor power is a design parameter and its configuration depends on the desired properties of the vacuum cleaner in which the invention should be embodied. The target motor power can be set to be constant over time or it may vary over time.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
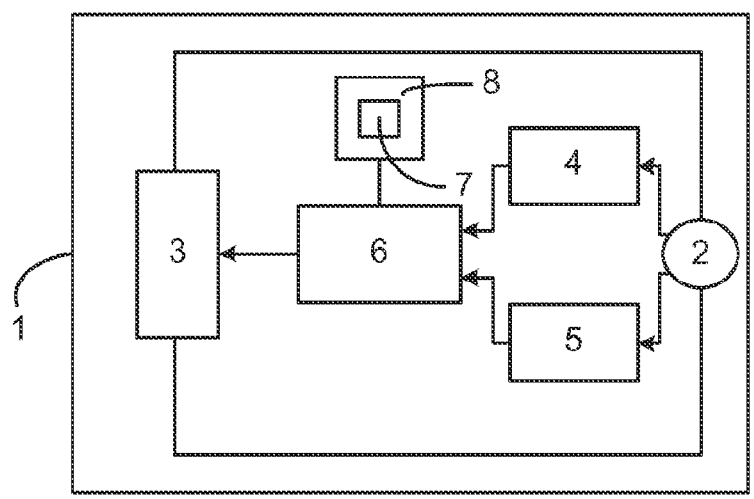
FIG. 1 shows a schematic block diagram of a vacuum cleaner according to an embodiment of the present invention.

The invention can be implemented in a general battery-driven vacuum cleaner, such as e.g. an upright/stick vacuum cleaner, a handheld vacuum cleaner, a robotic vacuum cleaner or a canister vacuum cleaner. FIG. 1 shows a schematic block diagram of a vacuum cleaner 1 according to an embodiment of the present invention, The vacuum cleaner 1 includes an electrical motor 2 powered by a battery source 3. The vacuum cleaner 1 further comprises a voltage measuring unit 4, which may be any suitable voltmeter, and current measuring unit 5, which may be any suitable ammeter, and a control unit 6 for controlling the electrical power applied to the motor 2 based on measurements made by the voltage measuring unit 4 and current measuring unit 5.

With reference to FIG. 1, it is to be noted that in the first aspect of the present invention, where motor voltage is measured and controlled, the current measuring unit 5 is omitted, whereas in the second aspect of the present invention, where motor current is measured and controlled, the voltage measuring unit 4 is omitted.

Further, control unit 6 (and corresponding control units referred to in the following) is typically embodied in the form of one or more microprocessors arranged to execute a respective computer program 7 downloaded to a suitable storage medium 8 associated with the microprocessor, such as a Random Access Memory (RAM), a Flash memory or a hard disk drive. The control unit 6 is arranged to at least partly carry out the methods according to embodiments of the present invention when the appropriate computer program 7 comprising computer-executable instructions is downloaded to the storage medium 8 and executed by the control unit 6. The storage medium 8 may also be a computer program product comprising the computer program 7. Alternatively, the computer program 7 may be transferred to the storage medium 8 by means of a suitable computer program product, such as a floppy disk or a memory stick. As a further alternative, the computer program 7 may be downloaded to the storage medium 8 over a network. The control unit 6 may alternatively be embodied in the form of an application specific integrated circuit (ASIC), a field-programmable gate array (FPGA), a complex programmable logic device (CPLD), etc.

Figure 2:
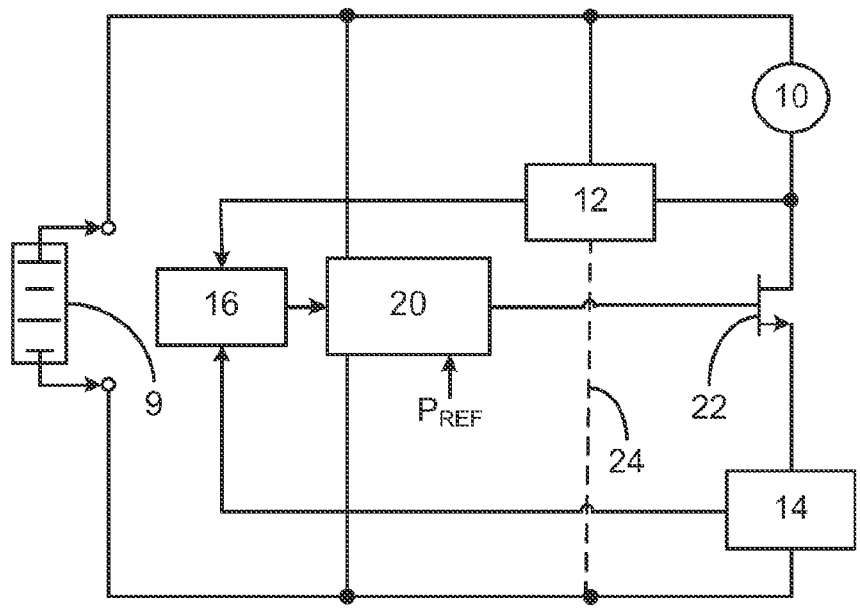
FIG. 2 shows a schematic block diagram of a vacuum cleaner according to another embodiment of the present invention.

An embodiment of a vacuum cleaner according to the present invention is shown in the schematic block diagram of FIG. 2, where a battery 9 powers a motor 10 being connected to a fan (not shown) which creates an airflow through the vacuum cleaner for collecting debris from a surface to be cleaned. A voltage measuring unit 12 and a current measuring unit 14 are provided. The voltage measuring unit 12 measures a voltage applied over the motor 10 and the current measuring unit 14 measures the current flowing through the motor. The voltage measuring unit 12 and the current measuring unit 14 provide the measured motor voltage and the measured motor current, respectively, to a power calculation unit 16 which calculates the actual motor power value and provides the value to a control unit 20. The power is typically calculated as $P=U \times I$. The control unit is further supplied with a target motor power value $P_{REF}$. The control unit 20 is hence arranged to control the power supplied to the motor 10 based on the actual motor power value and supplied by the power calculation unit 16 and the target motor power value $P_{REF}$ via a switch in the form of a MOSFET 22 or similar connected between the control unit 20 and the motor 10.

With reference to FIG. 2, it is again to be noted that in the first aspect of the present invention, where motor voltage is measured and controlled, the current measuring unit 14 is omitted, whereas in the second aspect of the present invention, where motor current is measured and controlled, the voltage measuring unit 12 is omitted. Further, in the first and second aspects of the invention, power calculation unit 16 is omitted, and the respective measured voltage or current is supplied directly to the control unit 20 to be compared with a corresponding reference voltage $V_{REF}$ or reference current $I_{REF}$.

In an embodiment of the present invention, the control unit 20 controls the power supplied to the motor 10 to be substantially constant, since such control will result in a substantially constant suction, which most likely is preferred by the user, as opposed to a slightly fluctuating suction noise which may be experienced as annoying by the user.

In a further embodiment of the present invention, the control unit 20 controls the power supplied to the motor 10 to lie within a range defined by an upper power threshold value and a lower power threshold value during the specified time period. As discussed in connection to the preceding embodiment, slight fluctuations in suction power is acceptable by the user as long as the motor is not experienced as racing.

In a further embodiment of the present invention, the control unit 20 of FIG. 2 is capable of generating pulse width modulation (PWM) signals to be supplied as control signal, and further capable of determining the characteristics of the generated PWM signals on the basis of the actual motor power value from the power calculation unit 16 and the target motor power value $P_{REF}$. The PWM signals can be generated by any known appropriate method.

When the battery source 9 applies power to the motor 10 and the control unit 20 generates a PWM signal with a period P and supplies the PWM signal to the gate of the MOSFET 22, the motor 10 is periodically switched on for the time T. A duty cycle D of the PWM signal is calculated as $D=T/P$. Hence, the greater the duty cycle D, the greater the supplied power to the motor 10. Hence, the control unit 20 can control the power supplied to the motor 10 by varying the duty cycle D of the PWM signal applied to the gate of the MOSFET 22.

In operation, the actual motor power value applied to the motor 10 is determined by measuring the motor voltage and motor current by means of the voltage measuring unit 12 and current measuring unit 14, respectively. The measured motor voltage and motor current are fed to the power calculation unit 16 and the actual motor power value is calculated as $P=U \times I$ and fed to the control unit 20. Furthermore, the target motor power value is fed to the control unit 20. The control unit 20 then controls the power supplied to the motor 10 by varying the duty cycle of the PWM signal provided to the MOSFET 22.

When an airflow of the vacuum cleaner is reduced, e.g. by partial or full Mocking of the vacuum cleaner inlet, the load on the motor 10 is reduced, which results in a reduction of current flowing through the motor 10. This will result in a decrease of the actual motor power value. The control unit 20 will control the PWM signal such that power supplied to the motor 10 attains the target motor power value $P_{REF}$. This is performed by increasing the duty cycle of the PWM signal. When the airflow is increased, the control unit 20 will control the PWM signal such that the power provided to the motor 10 decreases and subsequently attains the target motor power value $P_{REF}$, which is performed by decreasing the duty cycle of the PWM signal.

It is to be noted that the target motor power value $P_{REF}$ can be changed in case it is desirable to change actual motor power. It is envisaged that the target motor power value $P_{REF}$ is set to vary, in case a varying actual motor power is desired.

In addition to measuring the voltage over the motor 10, measuring of the voltage over the battery 9 may also be accomplished by the voltage measuring unit 12 as indicated by a dashed line 24. Battery voltage can be used in the control of the power, for determining the target motor power, for monitoring the battery status and/or controlling battery operation, etc.

Figure 3:
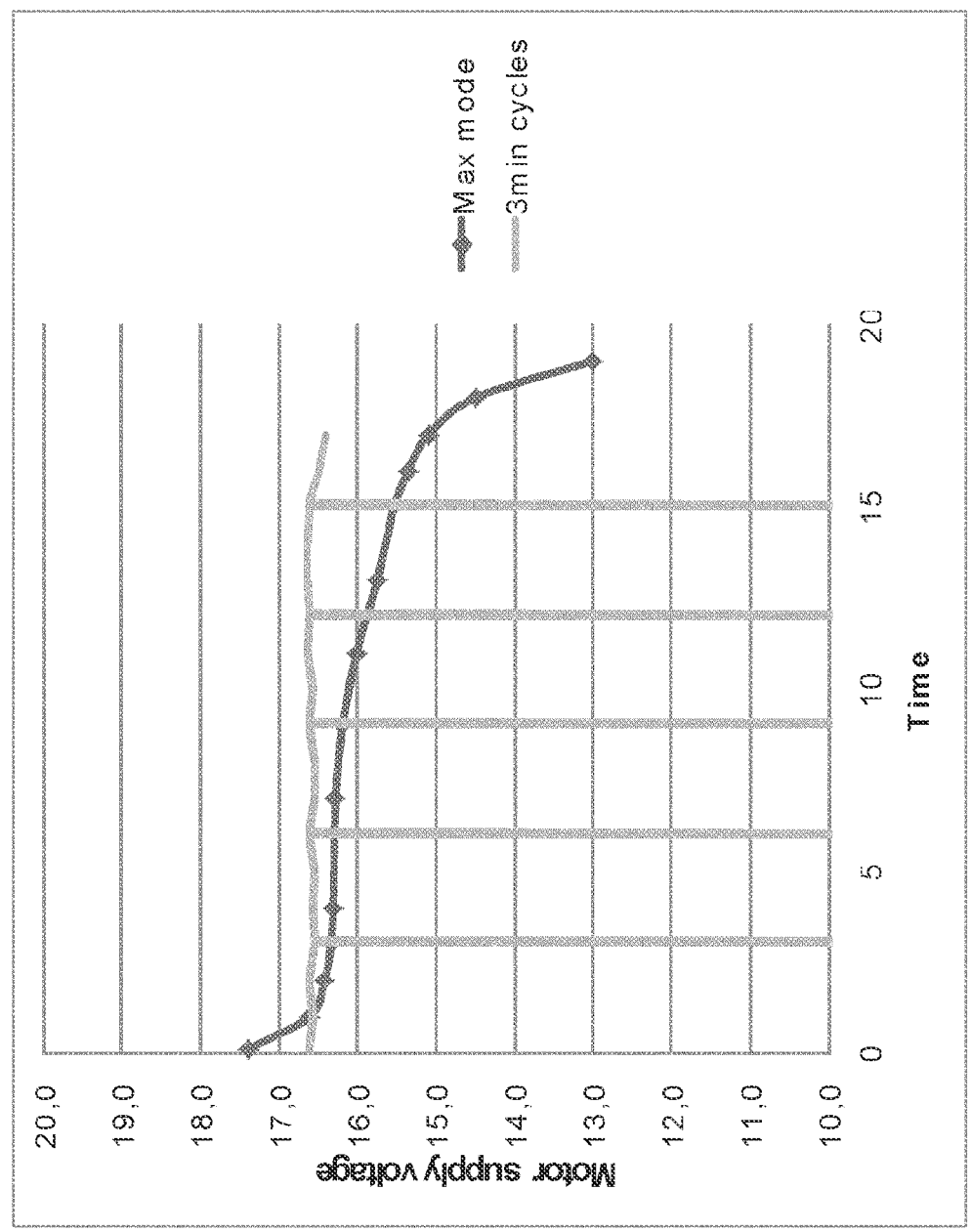
FIG. 3 illustrates how power provided to a vacuum cleaner motor is controlled according to embodiments of the present invention.

Now, with reference to FIG. 3, it is illustrated how the power provided to the vacuum cleaner motor is controlled according to embodiments of the present invention. The curve indicated by means of diamonds illustrates average motor supply voltage when the motor is set to produce a maximum suction power. As can be seen, the average motor supply voltage starts at about 16.5 V and slowly discharges to about 15.5 V at a running time of 15 minutes. From 15 minutes and on, it can be seen that the battery discharges rapidly. The curve indicated by means of squares illustrates average motor supply voltage when power control is undertaken according to the embodiments of the present invention. This will be further described in the following with reference to FIG. 4.

Figure 4:
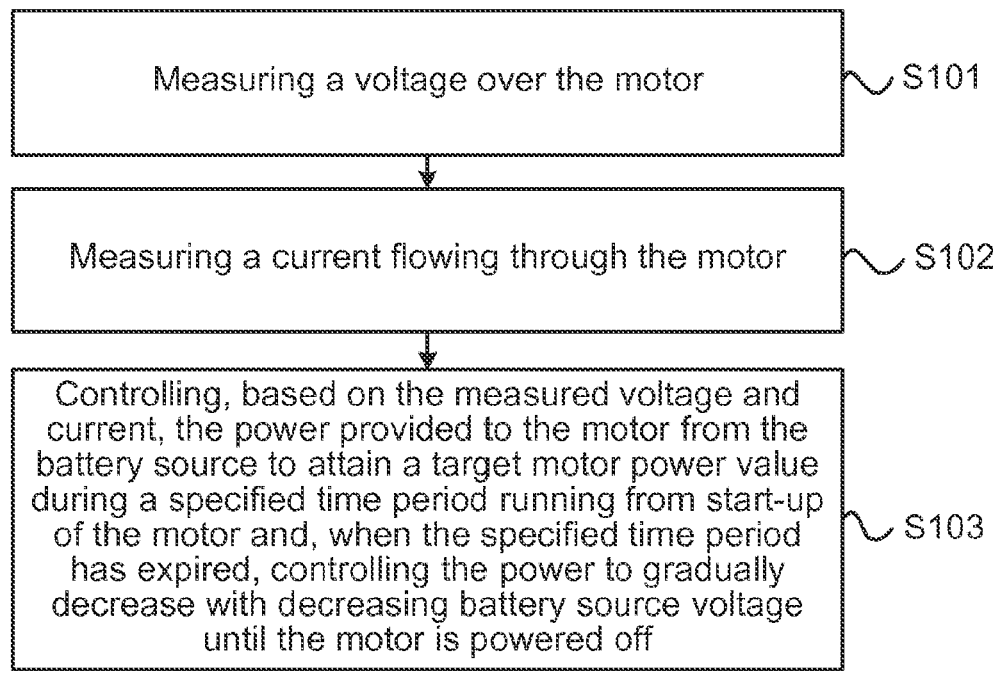
FIG. 4 shows a flowchart illustrating a method of controlling a motor driven by a battery source in a vacuum cleaner according to an embodiment of the present invention.

FIG. 4 shows a flowchart illustrating a method of controlling a motor driven by a battery source in a vacuum cleaner according to an embodiment of the present invention. In a first step, S101, voltage is measured over the vacuum cleaner motor. In a second step, S102, current flowing through the motor is measured. Then, in step S103, power provided to the motor from the battery source is controlled, based on the measured voltage and current, to attain a target motor power value. The power can be calculated as P=U×I. As is illustrated by the curve indicated with squares in FIG. 3, a target motor power value is applied, in this case illustrated by a corresponding motor supply voltage of approximately 16.5 V. This power is supplied to the motor for an exemplifying period of 3 minutes, and then vacuum cleaner is rapidly turned off. This is repeated for another four times and as can be seen, the method of embodiments of the present invention enables a relatively high motor power to be supplied for almost the complete battery discharge cycle. In this particular test undertaken, it was possible to apply the target motor power value for 15 minutes before the vacuum cleaner no longer could generate further suction power. In this particular example, should a user have operated the vacuum cleaner for more than three minutes, the method of embodiments of the present invention would have controlled the supplied motor power to gradually decrease with decreasing battery source voltage until the motor is powered off (or the battery is discharged). After the first three minutes of operating the vacuum cleaner the average motor supply voltage would have been set to slightly more than 16.5 V, i.e. the immediately preceding voltage value when the specified time period elapses, and unless the user had turned the vacuum cleaner off, the average motor supply voltage would have gradually decreased with decreasing battery source voltage until the battery is discharged.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of controlling a motor driven by a battery source in a vacuum cleaner, the method comprising:
   measuring at least one of a motor voltage over the motor and a motor current flowing through the motor; and
   controlling, based on the measured motor voltage and/or the measured motor current, the power provided to the motor from the battery source to attain a target motor power value that is substantially constant during a specified time period running from start-up of the motor and, when the specified time period has expired, controlling the power provided to the motor to gradually decrease with decreasing battery source voltage until the motor is powered off.

2. The method of claim 1, wherein the power provided to the motor is controlled to attain a target motor power value that lies within a range defined by an upper power threshold value and a lower power threshold value during the specified time period.

3. The method of claim 1, further comprising:
   calculating an actual power value of the motor from the measured motor voltage and the measured motor current;
   controlling a voltage supplied to the motor by the battery source by switching between an on state where a voltage is supplied to the motor, and an off state where no voltage is supplied to the motor, which switching is controlled by a square wave based on the actual motor power value and the target motor power value, a duty cycle of which square wave is controlled such that the average power provided to the motor from the battery source attains the target motor power value.

4. The method of claim 3, wherein
   controlling the power to gradually decrease with decreasing battery source voltage until the motor is powered off is performed by varying the duty cycle of the square wave controlling the on and off states.

5. The method of claim 1, wherein the measuring step comprises measuring the motor voltage, and the controlling step comprises controlling based on the measured motor voltage.

6. The method of claim 1, wherein the measuring step comprises measuring the motor current, and the controlling step comprises controlling based on the measured motor current.

7. A vacuum cleaner comprising:
   a motor;
   a battery source for providing power to the motor;
   at least one of a voltage measuring unit for measuring a motor voltage over the motor, and a current measuring unit for measuring a motor current flowing through the motor; and
   a control unit configured to control, based on the measured motor voltage and/or the measured motor current, the power provided to the motor from the battery source to attain a target motor power value that is substantially constant during a specified time period running from start-up of the motor and, when the specified time period has expired, and to control the power provided to the motor to gradually decrease with decreasing battery source voltage until the motor is powered off.

8. The vacuum cleaner according to claim 7, further comprising:
   a power calculation unit for calculating an actual power value of the motor from the measured motor voltage and the measured motor current; wherein
   the control unit is arranged to receive the actual motor power value from the motor power calculation unit and a target motor power value, and to control, based on the actual motor power value and the target motor power value, the power provided to the motor from the battery source to attain the target motor power value.

9. The vacuum cleaner according to claim 8, further comprising:
a switch configured to switch between an on state where a voltage is supplied to the motor, and an off state where no voltage is supplied to the motor, and wherein
the control unit is arranged for providing a control signal to the switch, the control signal being based on the actual motor power value and the target motor power value and arranged to cause the switch to switch between the on state and the of state, such that the average power provided to the motor from the battery source attains the target motor power value.

10. The vacuum cleaner according to claim 9, wherein the switch is a transistor; and
the control unit is capable of performing pulse width modulation, the control unit further being arranged to provide a square wave to the transistor, which square wave is based on the actual motor power value and the target motor power value and arranged to cause the transistor to switch between the on state and the off state such that the average power provided to the motor from the battery source attains the target motor power value.

11. The vacuum cleaner of claim 10, wherein
the control unit controls the power to gradually decrease with decreasing battery source voltage until the motor is powered off by varying a duty cycle of the square wave provided to the transistor.

12. The vacuum cleaner of claim 7, wherein the specified time period is 0-5 minutes.

13. The vacuum cleaner of claim 7, wherein the specified time period is 1-3 minutes.

14. The vacuum cleaner of claim 7, wherein the specified time period is around 2 minutes.

15. The vacuum cleaner according to claim 7, wherein the vacuum cleaner comprises the voltage measuring unit for measuring the motor voltage over the motor, and the control unit is configured to control the power provided to the motor based on the motor voltage.

16. The vacuum cleaner according to claim 7, wherein the vacuum cleaner comprises the current measuring unit for measuring the motor current, and the control unit is configured to control the power provided to the motor based on the motor current.

* * * * *